(12) United States Patent
El-Sheimy et al.

(10) Patent No.: US 11,630,119 B2
(45) Date of Patent: Apr. 18, 2023

(54) SYSTEM AND METHOD FOR DETERMINING AIRSPEED

(71) Applicant: UTI Limited Partnership, Calgary (CA)

(72) Inventors: Naser El-Sheimy, Calgary (CA); Shady Zahran, Calgary (CA); Adel Moussa, Calgary (CA)

(73) Assignee: UTI Limited Partnership, Calgary (CA)

( * ) Notice: Subject to any disclaimer, the term of this patent is extended or adjusted under 35 U.S.C. 154(b) by 831 days.

(21) Appl. No.: 16/433,731

(22) Filed: Jun. 6, 2019

(65) Prior Publication Data

US 2019/0376997 A1    Dec. 12, 2019

Related U.S. Application Data (60) Provisional application No. 62/681,233, filed on Jun. 6, 2018.

(51) Int. Cl.
*G01P 3/50* (2006.01)
*G01C 21/00* (2006.01)
*G01C 21/16* (2006.01)

(52) U.S. Cl.
CPC .............. *G01P 3/50* (2013.01); *G01C 21/005* (2013.01); *G01C 21/1654* (2020.08); *G01C 21/1656* (2020.08)

(58) Field of Classification Search
CPC ....... G01C 21/005; G01C 21/165; G01P 3/50; G01P 5/04
See application file for complete search history.

(56) References Cited

U.S. PATENT DOCUMENTS

| 4,625,565 A | * | 12/1986 | Wada ...................... G01P 5/04 73/861.74 |
| 5,438,880 A | * | 8/1995 | Washburn ................ G01P 5/16 73/718 |
| 8,096,507 B2 | * | 1/2012 | Cain ...................... B64C 23/06 343/705 |

(Continued)

FOREIGN PATENT DOCUMENTS

| CN | 204797862 U | * | 11/2015 | |
| CN | 108709677 A | * | 10/2018 | ........... B60R 16/023 |

OTHER PUBLICATIONS

Noureldin, A., et al. "Accuracy Enhancement of Inertial Sensors Utilizing High Resolution Spectral Analysis" Aug. 27, 2012, Sensors ISSN 1424-8220.

(Continued)

*Primary Examiner* — Nimeshkumar D Patel
*Assistant Examiner* — Gedeon M Kidanu
(74) *Attorney, Agent, or Firm* — Brion Raffoul (57) ABSTRACT

Systems and methods for use in determining a device's speed. The system uses a plate having a front side that is perpendicular to the device's direction of travel. The airflow caused by the device's motion causes the plate to deflect from a resting position and the amount of deflection of the plate is proportional to the speed of the device. The amount of deflection is measured by a rotary encoder coupled to the plate. By properly calibrating the system, the system can determine the device's velocity simply from the airflow caused by the device's motion.

18 Claims, 10 Drawing Sheets

(56) References Cited

U.S. PATENT DOCUMENTS

| | | | | |
|---|---|---|---|---|
| 2009/0152895 | A1* | 6/2009 | Jeong | B62D 35/008 |
| | | | | 296/180.5 |
| 2009/0165686 | A1* | 7/2009 | Memory | A01C 7/082 |
| | | | | 111/175 |
| 2013/0245980 | A1* | 9/2013 | Forbes | G01F 25/10 |
| | | | | 702/86 |
| 2018/0080775 | A1* | 3/2018 | Loomis | G01C 21/30 |
| 2020/0064438 | A1* | 2/2020 | Swanson | G01S 5/20 |
| 2020/0385115 | A1* | 12/2020 | Piasecki | H04B 10/2575 |

OTHER PUBLICATIONS

Weston, J. L., et al. "Modern inertial navigation technology and its application" Apr. 2000, Electronics & Communication Engineering Journal.

Balamurugan, G., et al. "Survey on UAV Navigation in GPS Denied Environments" Oct. 2016, Interational conference on Signal Processing, Communication, Power and Embedded System (SCOPES).

Taylor, C. N., et al. "Fusion of Inertial, Vision, and Air Pressure Sensors for MAV Navigation" Aug. 20-22, 2008, IEEE International Conference on Multisensor Fusion and Integration for Intelligent Systems. Seoul, Korea.

Mohamed, H., et al. "A Novel Real-Time Reference Key Frame Scan Matching Method" May 7, 2017, Sensors, 17, 1060.

Vadlamani, A. K., et al. "Flight Test Results of Loose Integration of Dual Airborne Laser Scanners (DALS)/INS" 2008, IEEE, Ohio University.

Mohamed, H. A., et al. "Improved Real-Time Scan Matching Using Corner Features" Jul. 12-19, 2016, The International Archives of the Photogrammetry, Remote Sensing and Spatial Information Sciences, vol. XLI-B5, 2016 XXIII ISPRS Congress, Prague, Czech Republic.

Baucher, B., et al. "Experimental Radar-Enabled Navigaton with UWB System in Indoor Environments" Jun. 28-30, 2017, The 18th International Radar Symposium IRS 2017, Prague, Czech Republic.

Jameson, B., et al. "Reconnaissance Using Adaptive Multi-Carrier Radar" 2013, 2013 IEEE Radar Conference.

Li, Tao., "Use of Wheel Speed Sensors to Enchance a Reduced IMU Ultra-Tight GNSS Receiver" Dec. 2009, Department of Geomatics Engineering, Calgary, Alberta.

Noureldin, A., et al. "Fundamentals of Inertial Navigation, Satellite-based Positioning and their Integration" 2013, Springer Heidelberg New York Dordrecht London.

Pollefeys, M., et al. "Detailed Real-Time Urban 3D Reconstruction From Video" Int. J. Comput. Vis., vol. 78, No. 2-3, pp. 143-167, Jul. 2008.

Nister, D., et al. "Visual Odometry" 2004, 2004 IEEE Computer Society Conference on Computer Vision and Pattern Recognition.

Scaramuzza, D., et al. "Performance Evaluation of 1-Point-RANSAC Visual Odometry" Jul. 5, 2011, GRASP Lab, University of Pennsylvania, Philadelphia, Pennsylvania.

Scaramuzza, D., et al. "Real-Time Monocular Visual Odometry for On-Road Vehicles with 1-Point RANSAC" Jul. 2009, Autonomous Systems Lab, Computer Vision and Geometry Group, ETH Zurich.

Quist, E. B., et al. "Radar Odometry on Fixed-Wing Small Unmanned Aircraft" Feb. 2016, IEEE Transactions on Aerospace and Electronics Systems, vol. 52, No. 1.

Quist, E. B., et al. "Radar Odometry with Recursive-RANSAC" Aug. 2016, IEEE Transactions on Aerospace and Electronic Systems vol. 52, No. 4.

Durrant-Whyte, H., et al. "Simultaneous Localization and Mapping: Part I" Jun. 2006, IEEE Robotics & Automation Magazine.

Bailey, T., et al. "Simultaneous Localization and Mapping (SLAM): Part II" Sep. 2006, IEEE Robotics & Automation Magazine.

Mostafa, M.M., et al. "Optical Flow Based Approach for Vision Aided Inertial Navigation Using Regression Trees" Jan. 2017, pp. 856-865, 2017 International Technical Meeting, Monterey, California.

Hemann, G., et al. "Long-range GPS-denied Aerial Inertial Navigation with LIDAR Localization" Oct. 9-14, 2016, 2016 IEEE/RSJ International Conference on Intelligent Robots and Systems (IROS) Daejeon, Korea.

Tang, J., et al. "LiDAR Scan Matching Aided Inertial Navigation System in GNSS-Denied Environments" Jul. 10, 2015, Sensors ISSN 1424-8220.

Aqel, M., et al. "Review of visual odometry: types, approaches, challenges and applications" 2016, SpringerPlus.

Applications, "Advantages and Limitations of Pitot Tubes", 2019, Mechoholic.

Buchnik, Y., et al. "Speed and Positon Estimation of Brushless DC Motor in Very Low Speeds" 2004, IEEE.

Paul, S., et al. "A New Approach to Detect Mover Position in Linear Motors Using Magnetic Sensors" Oct. 2015, Sensors ISSN 1424-8220. vol. 15.

Jezny, J., et al. "Position Measurement with Hall Effect Sensors" Nov. 2013, Science and Education Publishing, American Journal of Mechanical Engineering, vol. 1, No. 7, pp. 231-235.

Ferrazzin, D., et al. "Hall Effect Sensor-Based Linear Transducer" Sep. 1999, IEEE International Workshop on Robot and Human Interaction, Pisa, Italy.

Bienczyk, K., "Angle Measurement Using a Miniature Hall Effect Position Sensor" 2009, IEEE, Mechatronics.

Marvelmind Robotics, https://marvelmind.com/. Accessed Aug. 18, 2018.

Cadena, C., et al. "Past, Present, and Future of Simultaneous Localization and Mapping: Toward the Robust-Perception Age" Dec. 2016, IEEE Transactions on Robotics, vol. 32, No. 6.

* cited by examiner

"X" configuration

SYSTEM AND METHOD FOR DETERMINING AIRSPEED

RELATED APPLICATIONS

This application is a non-provisional patent application that claims the benefit of U.S. Provisional Application No. 62/681,233 filed on Jun. 6, 2018.

TECHNICAL FIELD

The present invention relates to navigation. More specifically, the present invention relates to systems and methods for detecting a device's airspeed as an aid to navigation.

BACKGROUND

UAVs (Unmanned Aerial Vehicles) have developed from a seeming toy/plaything into devices with myriad uses. Nowadays, UAVs have developed as a mainstay of modern life. Not only is it used in the military context as reconnaissance platforms and weapons platforms but in civilian life UAVs have an ever expanding list of roles.

In the past decade, UAVs have developed from requiring human operators to becoming semi-autonomous and, in some cases, to becoming fully autonomous devices. Of course, both full autonomy and semi-autonomy are achieved through the use of a multitude of onboard sensors. For navigation, these onboard sensors are mainly composed of IMUs (inertial measurement units) operating in conjunction with GNSS (global navigation satellite systems). The IMUs can be used to reliably estimate the navigation states for short periods of time through INS (inertial navigation system) mechanization.

While such devices and systems have proven to be useful for the UAV field, such mechanization has its own issues. As is well-known, such mechanization will include mathematical integration (i.e. estimates of mathematical results) and such integration can necessarily lead to a massive accumulation of errors and inaccurate navigation states over long time periods. To achieve an accurate navigation solution that is useful over long periods of time, the GNSS system used is required to bound (i.e. impose limits on) the drift exhibited in the INS solution through GNSS/INS integration.

On a related note, current developments in UAV technology has allowed smaller UAVs to be operate in more challenging areas such as forests, caves, heavily urbanised areas, or even in physically hostile environments. In such areas, GNSS coverage can be either minimal or non-existent, with signals being either unable to reach the UAV or with signals being actively blocked. Such GNSS signal degradation will challenge the ability of UAVs to navigate autonomously.

To overcome the above noted absence of GNSS system as well as to limit the above noted issue with INS solution drift, different techniques have been proposed based on various sensors such as cameras, Light Detection and Ranging (LIDAR), and Radio Detection and Ranging (RADAR). Unfortunately, most of these alternative techniques have their drawbacks and issues.

Limiting the massive drift exhibited by the IMU during Dead-Reckoning (DR) can be achieved with the aid of different sensors. The information gained from these sensors can be fused as position, velocity, or attitudes update. Velocity update greatly enhances the navigation solution, as the horizontal velocity is coupled (Schuler effect) with roll and pitch angles. The velocity of the vehicle can be measured using various sensors such as cameras.

Visual odometry is the process of determining the location and orientation of a camera by analyzing a sequence of images. Monocular Visual Odometry (VO) uses a single camera and can be classified into two main approaches, Structure From Motion (SFM), and fundamental matrix with both of these approaches being mainly utilized to estimate the camera poses. The main issues with using a monocular camera are the scale ambiguity and the susceptibility to drift of the estimated position if the estimated position is not integrated with another aiding sensor.

The above problem of scale ambiguity can be solved when stereo or multiple cameras are used, with accuracy mainly depending on the baseline between cameras. Other approaches utilize Machine Learning (ML) approaches to estimate the velocity from monocular camera and to solve the scale ambiguity. Regardless of the number of cameras used or the configuration of these cameras, system performance is susceptible to environmental changes such as lighting conditions. As well, system performance can be severely degraded due to lack of features. In addition, when using multiple cameras, other drawbacks must be taken into consideration such as power consumption, weight, computations, and cost.

Radar can also be used as an aiding sensor to assist the navigation solution during GNSS signal blockage. Different approaches to this have been utilized such as Radar Odometry (RO). In one approach, a Synthetic Aperture Radar (SAR) is fixed on a Cessna aircraft, a compressed image is formed from the scatterers of stationary ground targets, and then the Hough transform is used to extract these targets to estimate range and range rate. These are then used in integration through EKF under an assumption of relatively constant heading. Another approach is based on range progression to estimate a vehicle's relative motion using recursive-RANSAC to separate outliers and to clearly identify targets. Other approaches use a two-dimensional odometer through multiple target tracking algorithm based on Global Nearest Neighbor (GNN). Regardless of the used radar approach, radar utilization faces limitations especially when applied to small and micro UAV. Considerations such as weight, size, cost, power consumption, and large computation requirements render radar utilization questionable for use with smaller UAVs.

Another common approach for aiding the navigation solution is Simultaneous Localization and Mapping (SLAM) with the aid of different sensors. For this approach, one commonly used sensor is LIDAR. Despite the impressive capabilities of LIDAR, it is not suitable for small and micro UAVs due to its weight, size, power consumption, and cost. In addition, LIDAR requires a large amount of computation as its measurements may reach half million points every second. LIDAR is therefore not as useful for real-time applications. As well, using LIDAR in outdoor environments with UAVs is challenging.

To summarize, regardless of the approach and the sensor used, due consideration must be given to the limited space, weight, size, power, cost, and computational power of the targeted small or micro UAV platform.

Based on the above, there is therefore a need for systems and methods that address the above issues while mitigating if not overcoming the shortcomings of the prior art.

SUMMARY

The present invention provides systems and methods for use in determining a device's speed. The system uses a plate having a front side that is perpendicular to the device's direction of travel. The airflow caused by the device's motion causes the plate to deflect from a resting position and the amount of deflection of the plate is proportional to the speed of the device. The amount of deflection is measured by a rotary encoder coupled to the plate. By properly calibrating the system, the system can determine the device's velocity simply from the airflow caused by the device's motion.

In one aspect, the present invention provides a system for use in determining a speed of a moving device, the system comprising:
 a plate having a front side exposed to an airflow outside of said device as said device is moving, said airflow causing said plate to deflect from a predefined resting position;
 a subsystem for measuring an amount of deflection of said plate as said plate deflects due to said airflow as said device is in motion;
wherein said amount of deflection of said plate from said resting position is proportional to a speed of said airflow, said speed of said airflow being related to said speed of said moving device.

In another aspect, the present invention provides a speed determination system, the system comprising:
 a deflection based subsystem mounted on a moving device exposed to an airflow, said deflection based subsystem comprising a component whose deflection due to an exposure to said airflow is related to a speed of said moving device;
 a deflection measurement subsystem for determining said deflection of said deflection-based subsystem;
wherein
 said deflection is measured from a predefined resting position of said component.

In yet a further aspect, the present invention provides a method for determining a speed of a moving device using a speed determination system mounted on said device, the method comprising:
a) providing a deflection-based subsystem as part of said speed determination system, said deflection based subsystem comprising a component exposed to an airflow;
b) determining an amount of a deflection of said component, said deflection of said component being caused by said airflow, said amount of deflection being measured relative to a predefined resting position;
c) using a data processing device, calculating said speed based on said amount of deflection;
wherein
 said airflow is outside of said device as said device is moving; and
 a deflection of said component is related to a speed of said moving device.

BRIEF DESCRIPTION OF THE DRAWINGS

The embodiments of the present invention will now be described by reference to the following figures, in which identical reference numerals in different figures indicate identical elements and in which.

DETAILED DESCRIPTION

In indoor or outdoor environments, there are several ways to aid the IMU during a GNSS outage or when GNSS signals are unavailable. As noted above, most of these methods suffer from various limitations such as high cost, heavy weight, high power consumption, need for high computational power, the inability to work in darkness, and the inability to work in areas with minimal features. Moreover, most of recently developed UAVs cannot use of the common pitot tubes as a velocity sensor. This sensor is very sensitive to air flow direction and requires high-velocity air flow as small changes in velocity profiles do not induce enough change in differential pressure that can be sensed by pitot tube. There is therefore a need for suitable devices and systems that can act as an odometer for UAVs while overcoming the above limitations.

It should be clear that, during a UAV's flight, there is relative airflow in a direction opposite to the UAV's direction of movement. The present invention seeks to take advantage of this relative airflow to estimate the device's velocity. Once the velocity has been estimated, this can then be used as an effective odometer to aid the INS during a GNSS outage.

Figure 1:
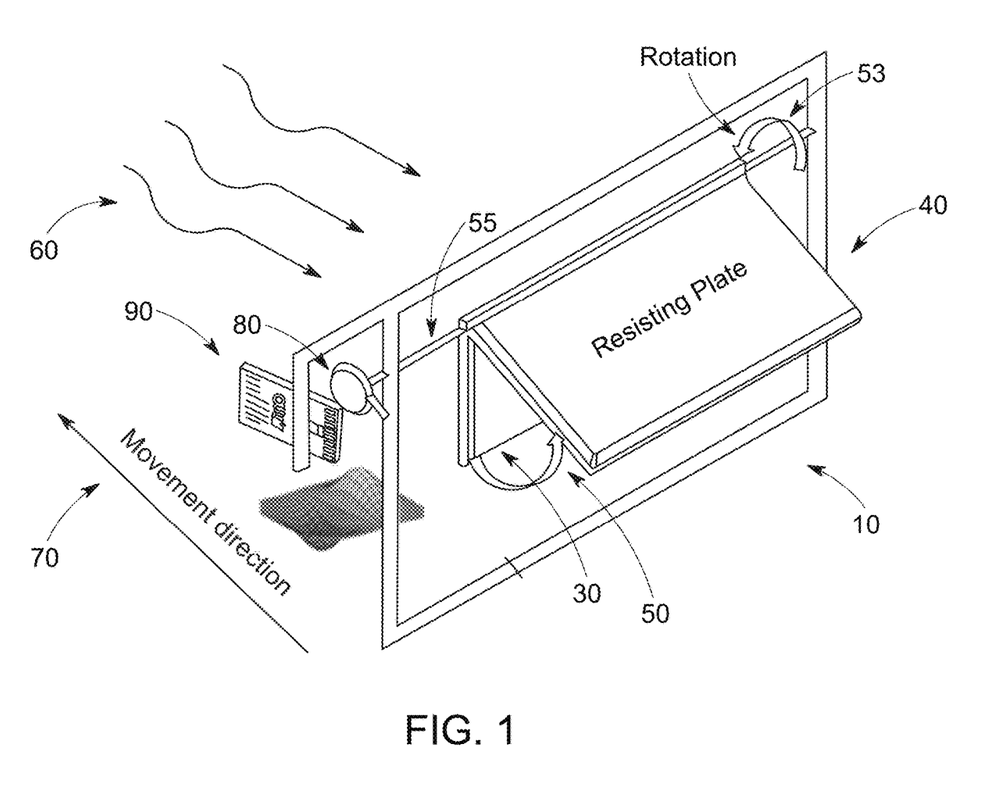
FIG. 1 is an illustration of one aspect of the present invention.

Referring to FIG. 1, a diagram illustrating one implementation of the present invention is provided. As can be seen, the system 10 uses a plate 20 that is illustrated in two positions in FIG. 1. In position 30, the plate is at a resting position while at position 40, the plate is deflected from the resting position. The arrow 50 shows that path of the deflection of the plate while the direction 53 of rotation about an axis 55 is also illustrated. As can be seen, when at the resting position, the plate is perpendicular to the airflow 60 over the surface of the device. This airflow 60 flows at a direction opposite to the device's direction of travel. Also visible in FIG. 1 is that the plate is coupled to an encoder 80 that operates with (and may be part of) a subsystem 90 to measure and encode the amount of deflection of the plate due to the airflow 60.

In one implementation, the encoder 80 uses a magnet that also rotates about the axis 55 as the plate rotates due to the airflow 60. The magnet operates in conjunction with a Hall effect sensor that detects and measures any changes to the position of magnetic field peaks in the magnetic field. The changes to the magnetic field peaks are proportional to the amount of deflection of the plate and the amount of deflection is proportional to the speed of the airflow 60. Thus, by properly calibrating the system 10, the speed of the airflow (which is proportional to the velocity of the device) can be determined and, accordingly, the velocity of the device can also be determined.

Figure 2:
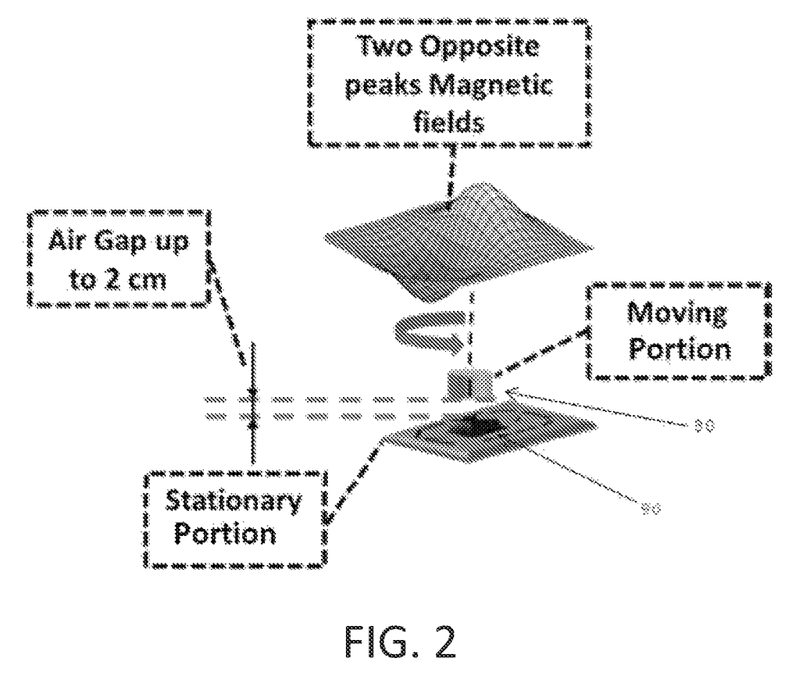
FIG. 2 is a schematic diagram of the encoding mechanism of one aspect of the present invention.

Referring to FIG. 2, a schematic diagram of the main components of the subsystem 90 is illustrated. As can be seen, a rotatable magnet 80 operates with a stationary Hall effect sensor on the subsystem 90. The rotation of the rotatable magnet 80 causes peaks in the magnetic field and changes in these peaks are detected and measured by the Hall effect sensor. It should be clear that the rotatable magnet is physically separated from the stationary Hall sensor by about up to 2 cm.

For clarity, the Hall effect sensor is a transducer which is used to measure the magnetic field. This measured magnetic field can be utilized in many different ways according to the required task and application.

In one implementation, the Hall effect sensor used is contactless 360 degrees angle position sensor AS5048A board, which is a 14-bit magnetic rotary encoder having a 0.0219 degrees resolution. The sensor is used with a stationary and rotary part. The rotary part works with two opposite magnets while the integrated circuit (IC) in the subsystem detects the peaks of the opposite magnetic fields and determines the absolute angle. The change between these two peaks are measured and detected.

In order to change the rotation angle according to the relative airflow resulting from the device/UAV motion (which indicates the relative speed of the device), the structure used takes advantage of the lifting force applied on immersed bodies from airflow as seen in FIG. 1.

$$L = \tfrac{1}{2} \rho V^2 A C_L \quad (1)$$

In Equation (1), L is the lifting force, $\rho$ is the air density, V is the velocity of flow, A is the area of the plate (i.e. the immersed body), and $C_L$ is the lifting coefficient.

Figure 3:
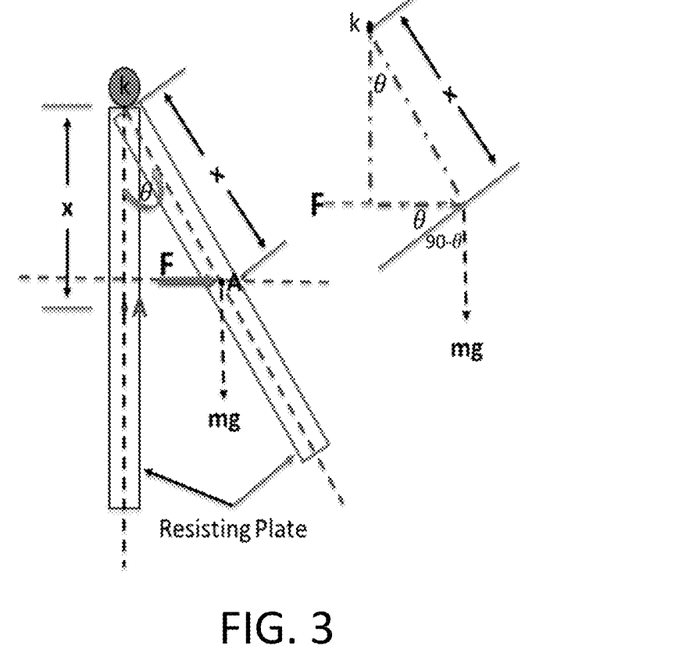
FIG. 3 schematically illustrates the effect of the motion of the UAV that will cause a relative airflow corresponding to the UAV velocity and where the airflow will introduce a force on the resisting plate, thereby causing the plate to rotate.

The relation between the angle caused by the relative airflow and the velocity is given in the following equations. The schematic illustration of the various variables for these equations is shown in FIG. 3.

$$F \cdot \cos(\theta) = mg \cdot \cos(90 - \theta) \quad (2)$$

$$F \cdot \cos(\theta) = mg \cdot \sin(\theta) \quad (3)$$

In Equation (2), F is the force resulting from the relative airflow, m is the mass of the resisting plate. g is the gravity constant, $\theta$ is the angle of the resisting plate (or component) from its zero or resting position.

Substituting Eqn. (1) in Eqn. (3), $$\tfrac{1}{2} \rho V^2 A C_D \cdot \cos(\theta) = mg \cdot \sin(\theta) \quad (4)$$

$$\tan(\theta) = \frac{\rho V^2 A C_D}{2\,mg} \quad (5)$$

Some of the variables in Eqn. (5) can be considered as constants for a specific design ($\rho$, A, $C_D$, m, and g). This will lead to Eqns. (6) and (7):

$$\tan(\theta) = Const \cdot V^2 \quad (6)$$

$$const = \frac{\rho A C_D}{2\,mg} \quad (7)$$

Figure 4:
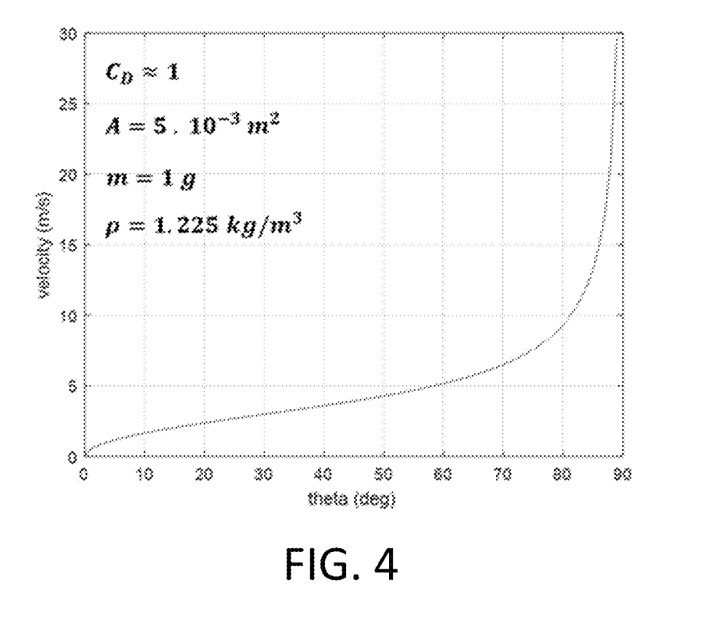
FIG. 4 is a graph illustrating the mathematical relationship between the velocity of the UAV and the deflection angle (using some arbitrary values provided in the Figure)

The mathematical relationship between the velocity of the UAV and the deflection angle (using some arbitrary values) is shown in the graph of FIG. 4. For clarity, $C_D$ in Eqn (7) is the same as $C_L$ in Eqn. (1).

It should be clear that, when the system in FIG. 1 is attached to the UAV body such that the plate is subject to the airflow about the UAV, the motion of the UAV will result in a relative air flow which will induce a lifting force that will cause the plate to rotate (i.e. deflect from its resting position). The deflection of the plate causes the encoder, to which the plate is coupled, to encode the amount or angle of deflection. The rotation angle or amount of deflection measured by the subsystem is proportional to the speed of the air flow as well as to the speed of the UAV. During GNSS availability, the model describing the relationship between the rotation angle and the speed is fitted using a least-squares method.

Regarding the implementation of the system, the plate may be constructed from balsa wood to ensure low mass. In one implementation, the complete system weighed less than 50 grams while the plate weighed only 2 grams. In other implementations, other materials may be used for the plate and suitable calibrations may need to be performed to ensure that a proper measurement of the UAV's speed is executed. As can be imagined, depending on the choice of material for the plate, the calibration may be executed in various ways. In one method, the system can be calibrated by using a simple least squares method to properly map the measured angle deflection to the UAV velocity while there is GNSS availability. Once this mapping has been performed, the mathematical function derived from the calibration can be used to determine vehicle velocity when GNSS is not available.

The velocity from the system acts as a velocity update to enhance the navigation solution during GNSS outage through EKF.

Coordinate Frames

The navigation frame adopted while testing the system is the North, East, and Down (NED) coordinate frame. The device/UAV configuration for this implementation was the X-configuration, where the X-axis is between motor 1 and 2 arms, Y-axis is between motor 2 and 3 arms, and Z-axis completes the right-hand rotation rule and pointing upwards. (See FIG. 3 for reference)

Extended Kalman Filter (EKF) and Framework

IMU (accelerometers and gyros) raw measurements pass through a mechanization process to obtain the UAV's navigation states (position, velocity, and attitudes). The error resulting from the difference between the INS and the GNSS solution is then fed to a Kalman filter to correct the navigation states by estimating the errors in these states.

The EKF is composed of 21 states.

$$\delta x = \begin{bmatrix} \delta P^n \\ \delta V^n \\ \delta \varepsilon^n \\ a_b \\ g_b \\ a_s \\ g_s \end{bmatrix} \quad (8)$$

In Equation (8), $\delta P^n$, $\delta V^n$, $\delta \varepsilon^n$ are the position, velocity and attitudes errors respectively while $a_b$ and $a_s$ are the accelerometers biases and scale factors, and $g_b$ and $g_s$ are the gyroscopes biases and scale factors.

To obtain the system model, the mechanization equations are linearized using first-order differential equations as in Equations (9) and (10). This is then discretized to represent the EKF prediction step.

$$\dot{x} = Fx + Gw \quad (9)$$

$$\hat{x}_k^- = \Phi_{k,k-1}\hat{x}_{k-1} + G_{k-1}w_{k-1} \quad (10)$$

In Equations (9) and (10), x is the error states vector, F and $\Phi$ are the dynamic and state transition matrices, G is the noise coefficient matrix, and w is the system noise. The Gauss-Markov (GM) process is used to describe the biases and scale factors stochastic errors of the accelerometers and gyroscopes.

The state covariance matrix P can be propagated (predicted) as follows. In Equation (11) below, Q is the system noise covariance matrix.

$$P_k^- = \Phi_{k,k-1} P_{k-1} \Phi_{k,k-1}^T + G_{k-1} Q_{k-1} G_{k-1}^T \quad (11)$$

When GNSS is available or when there is available information from any other aiding sensor such as the system of the invention or a magnetometer, such new information is fused through the filter as an update step as follows.

$$K_k = P_k^- H_k^T (H_k P_k^- H_k^T + R_k)^{-1} \quad (12)$$

$$\hat{x}_k = \hat{x}_k^- + K_k(Z_k - H_k \hat{x}_k^-) \quad (13)$$

$$P_k = (1 - K_k H_k) P_k^- \quad (14)$$

In Equations (12), (13), and (14), $K_k$ is the Kalman gain, $R_k$ is the measurements covariance matrix, $H_k$ is the design matrix, and $Z_k$ is the observation matrix.

The heading angle $\psi_{mag}$ can be calculated by processing the raw magnetometer measurements from the three-perpendicular unit-vector readings $[M_x\ M_y\ M_z]$.

$$\psi_{mag} = \tan^{-1}\left(\frac{-M_y \cos\Phi + M_z \sin\Phi}{M_x \cos\theta + (M_y \sin\Phi + M_z \cos\Phi)\sin\theta}\right) + \delta_{mag} \quad (15)$$

In Equation (15), $\Phi$ is the roll angle, $\theta$ is the pitch angle and $\delta_{mag}$ is the magnetic declination, which represents the difference between true north and magnetic north.

The magnetometer heading and system's velocity measurement can be represented as follows:

$$\hat{\psi}_{mag} = \psi_{mag} + \Delta_{\psi_{mag}} \quad (16)$$

$$\hat{V}_{OdoFin} = V_{OdoFin} + \Delta_{V_{OdoFin}} \quad (17)$$

In Equations (16) and (17), $\Delta_{\psi_{mag}}$, $\Delta_{V_{OdoFin}}$ are the errors in the magnetometer heading and the OdoFin system measurements respectively. (It should be clear that the terms "OdoFin" and "Air-Odo" refer to implementations of the system of the present invention.)

The measurement model used for the EKF update is the difference between the heading and velocity measured from the INS and magnetometer and the OdoFin system.

$$z_{Heading} = \hat{\psi}_{INS} - \hat{\psi}_{mag} \quad (18)$$

$$z_{Velocity} = \hat{V}_{INS} - \hat{V}_{OdoFin} \quad (19)$$

During the deterioration of the GNSS signals, the EKF will be updated with the velocity and heading readings from the OdoFin system and the magnetometer.

Figure 5:
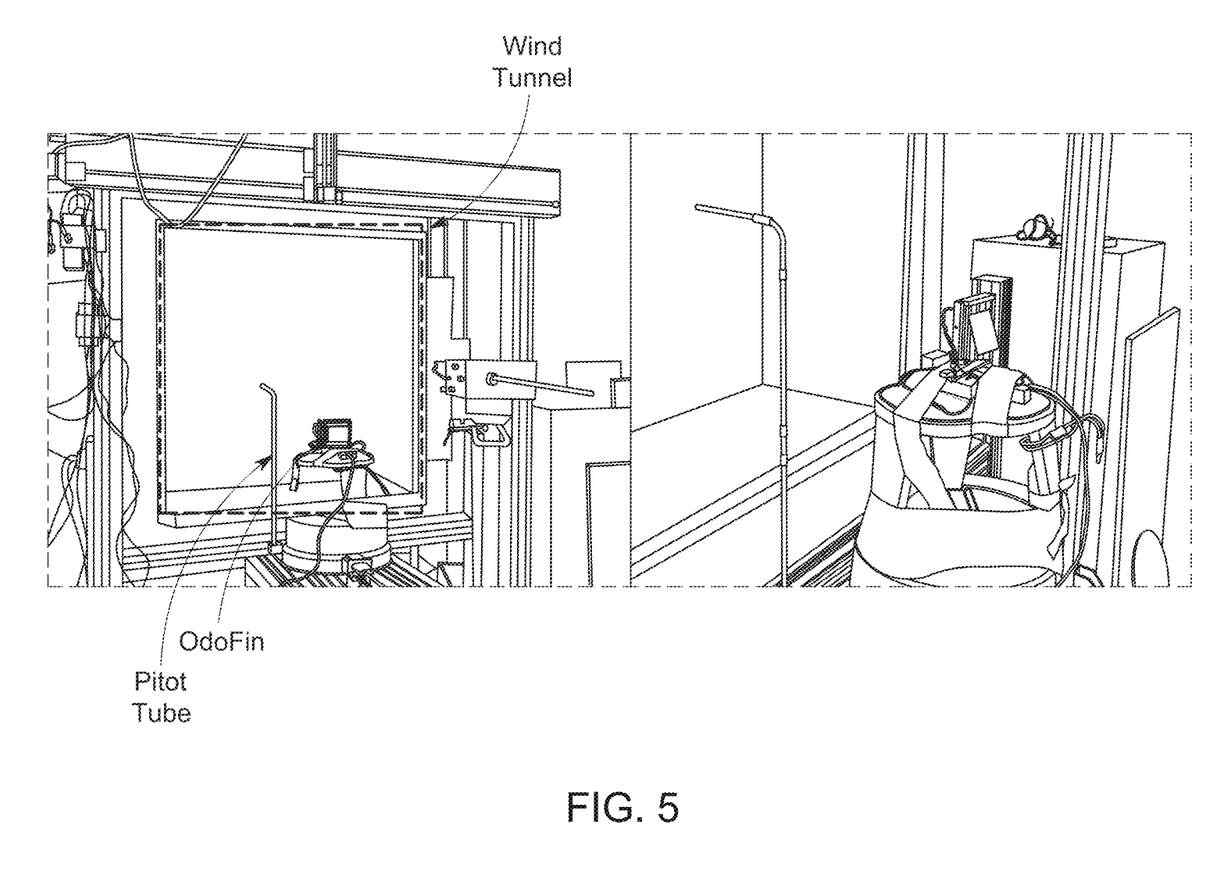
FIG. 5 illustrates a wind tunnel experiment setup used to determine the relation between the component deflection angle and the velocity of air from the wind tunnel.

To prove the derived relation between the rotation angle (or deflection angle) and velocity estimated, a real experiment in a wind tunnel was carried on with test setup as illustrated in FIG. 5.

Figure 6:
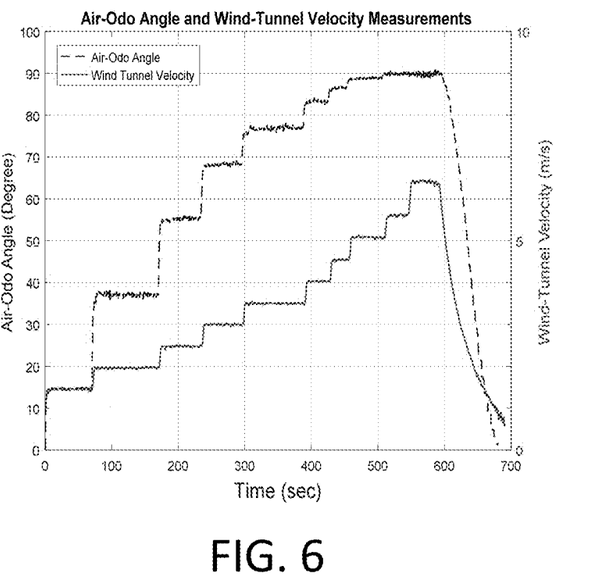
FIG. 6 is a graph illustrating the velocity of the wind-induced by the wind tunnel and the corresponding angle measured from the system of the invention.

The velocity of the wind (induced by the wind tunnel) and the corresponding deflection angle measured from the Air-Odo system is shown in the graphs of FIG. 6.

To achieve a better estimate of the constant in Eqn. (7), as there are several minor effects that might have not been modeled (e.g. friction), least square adjustment (LSA) is applied. After reaching a better estimate of this constant, it can be used to estimate the velocity using the following equation (Eqn. (20)).

$$v = Sqrt\left(\tan\left(\frac{OdoFin_{angle}}{Const}\right)\right) \quad (20)$$

By applying LSA, then utilizing the estimated constant value in Eqn. (20), this yields the velocity shown in the graph of FIG. 7. For clarity, $OdoFin_{angle}$ refers to the deflection angle of the plate or component.

Figure 7:
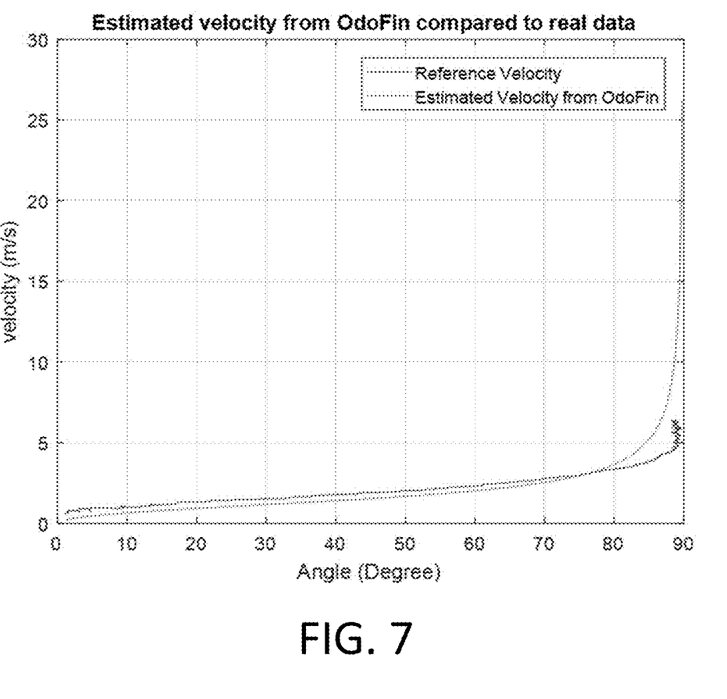
FIG. 7 shows the estimated velocity from one aspect of the invention (after applying LSA to estimate the constant) compared to the reference velocity from the wind tunnel (using a first experiment setup)

FIG. 7 also shows that the Air-Odo system was able to estimate the velocity. However, FIG. 7 also shows that, at angles above 80 degrees, the system may not be as useful.

For each Air-Odo variant, there is a limitation regarding the least and maximum velocity that can be estimated. This limitation can be overcome if the mass of the resisting part or component is increased as this will give the Air-Odo system a higher dynamic range as will be shown in the second experiment.

Figure 8:
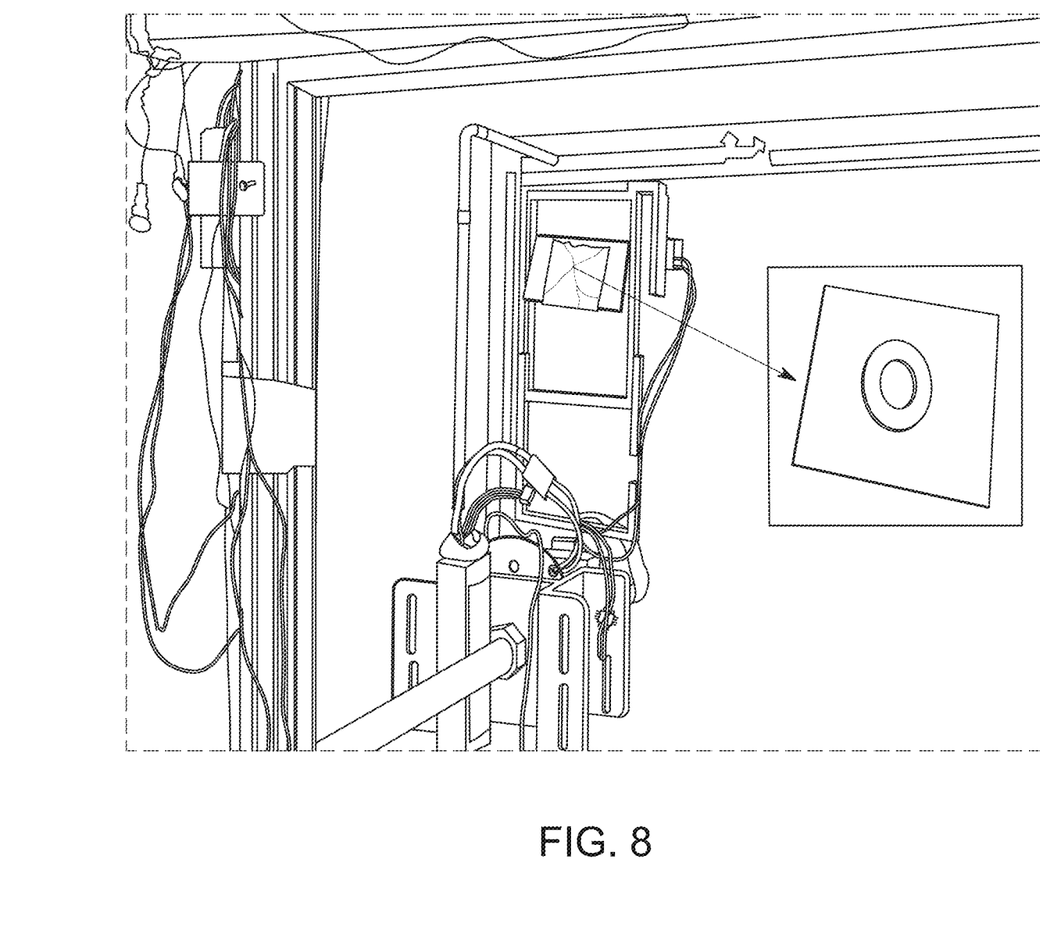
FIG. 8 shows the additional mass (8 grams) added to the resisting plate to increase the system's dynamic velocity range of measurements.

In the second experiment, an additional mass (8 grams) was added to the resisting plate (as shown in FIG. 8) to increase the dynamic velocity range of measurements for the system of the invention.

Figure 9:
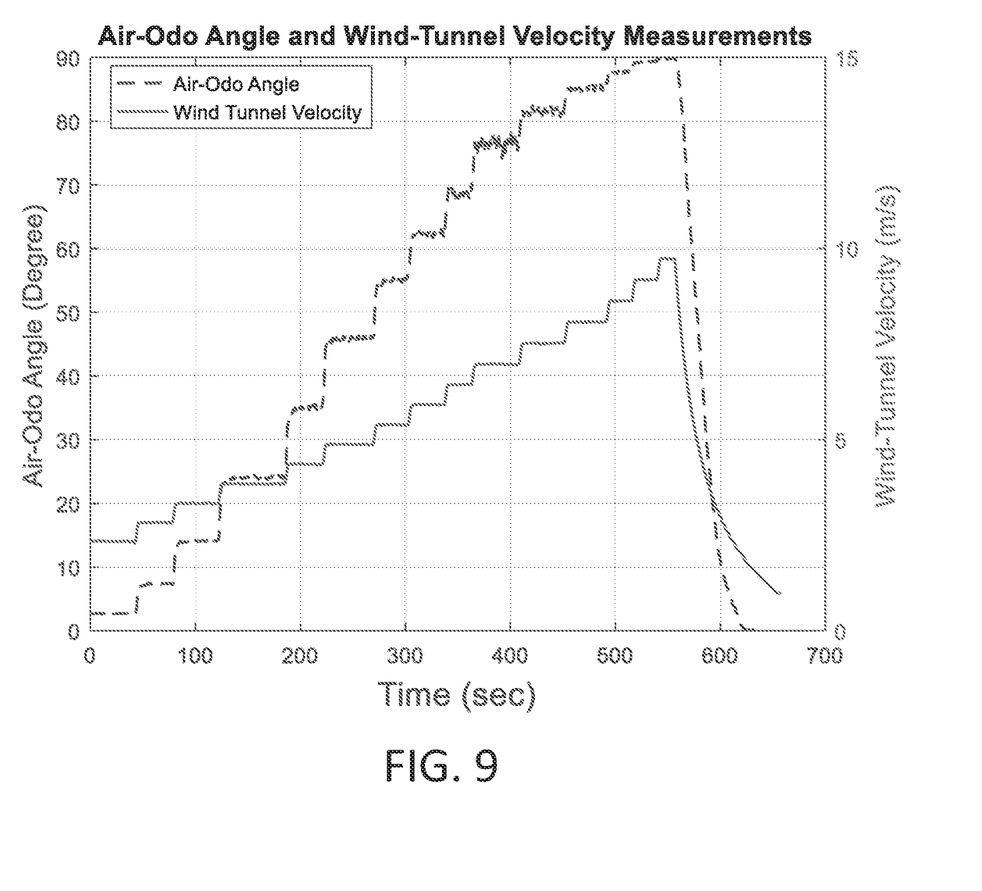
FIG. 9 is a graph illustrating the velocity from the wind tunnel and its corresponding angles from the system measurements in the second experiment after increasing the mass of the resisting plate.

Referring to FIG. 9, the velocity from the wind tunnel and its corresponding angles from the Air-Odo system readings in the second experiment is shown. As noted above, these readings were achieved after increasing the mass of the resisting plate.

Figure 10:
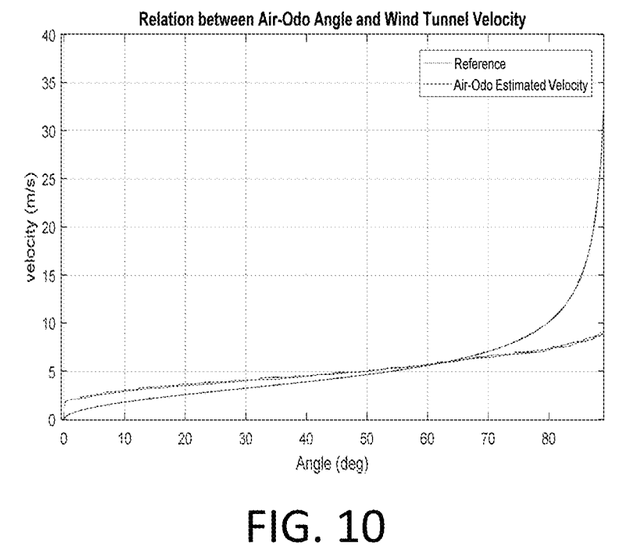
FIG. 10 is a graph illustrating the estimated velocity from one aspect of the invention (after applying LSA to estimate the constant value) compared with the reference wind velocity from the wind tunnel in a second experiment with the resisting plate mass being increased by 8 grams.
Figure 11:
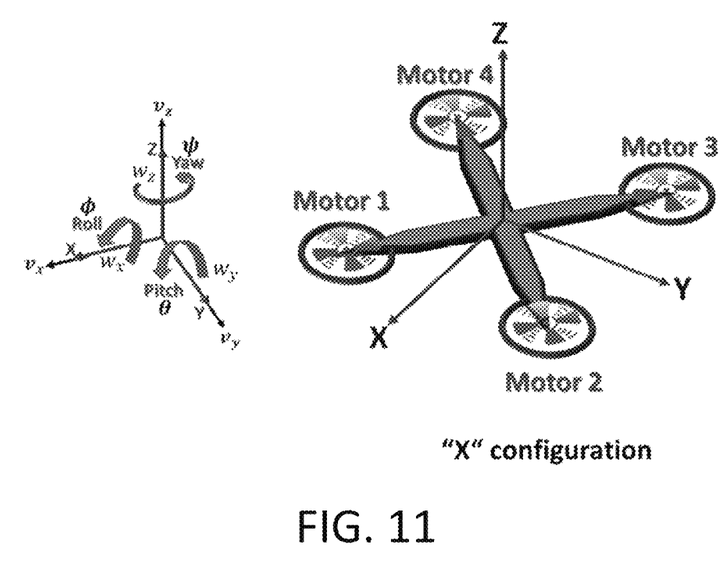
FIG. 11 illustrates the coordinate system relative to a UAV as used in one implementation of the present invention.

Referring to FIG. 10, this figure shows the estimated velocity from the Air-Odo system (after applying LSA to estimate the constant value) compared against the reference wind velocity from the wind tunnel (second experiment).

Figure 13:
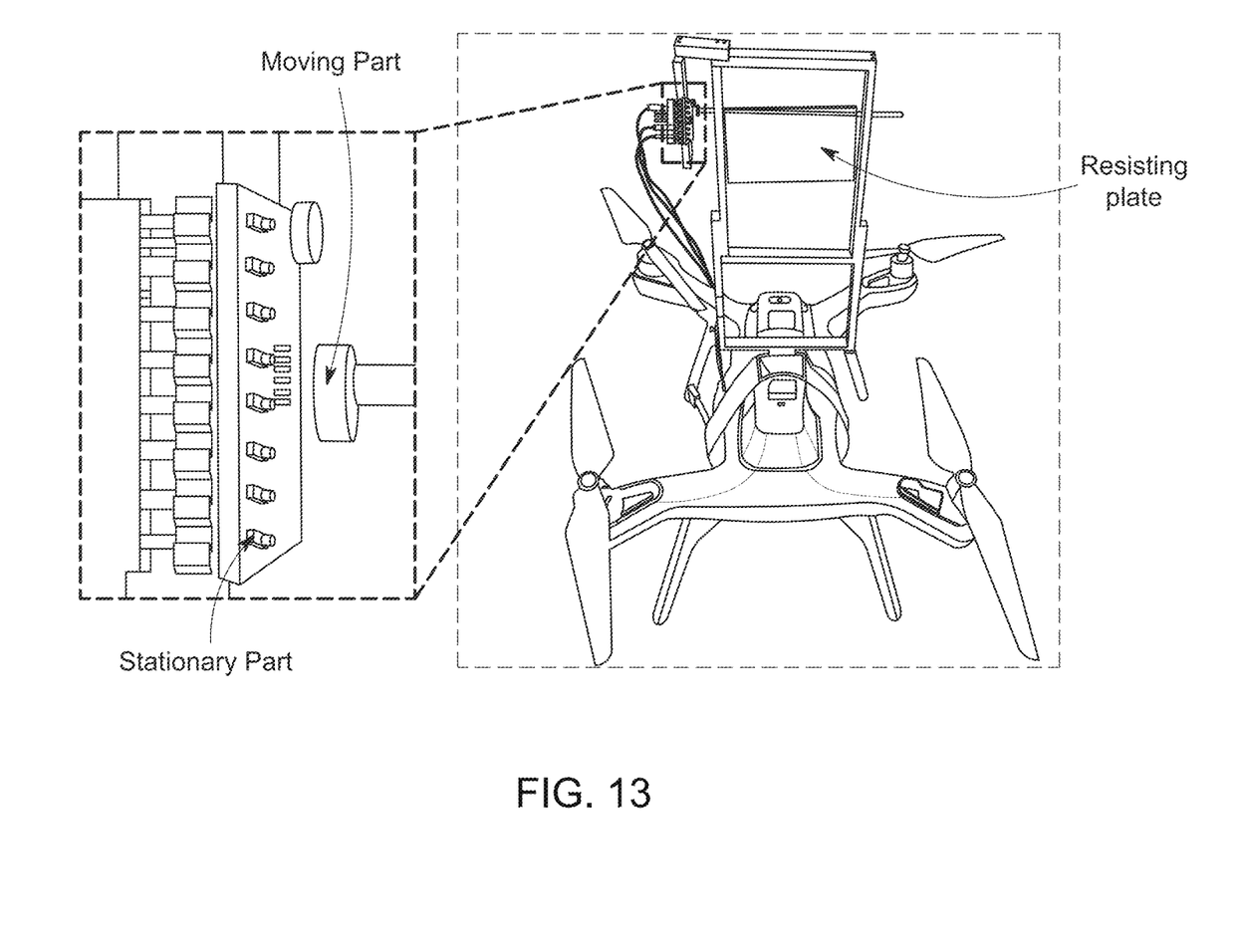
FIG. 13 shows pictures illustrating the system of the present invention as mounted on a UAV in one implementation.

In order to verify the ability of the system to aid the navigation solution during a GNSS outage and to supply the EKF with the device's velocity, two real flights in two different days were conducted with a 3DR Solo quadcopter. During these flights, a prototype of the present invention was attached to the top of the quadcopter as seen in FIG. 13. In this implementation, a 3DR Solo quadcopter was loaded with a Pixhawk-v2 autopilot with a MEMS-based IMU InvenSense MPU-9250 and a U-blox GPS receiver. The total available useful weight was 420 g.

For testing purposes, the system of the present invention was attached to the top of the quadcopter body, while a MY-RIO board was attached to the quadcopter belly to acquire the data from the system and store to store that data in a USB flash drive. It should be clear that MY-RIO is an embedded system board, equipped with Xilinx Zynq 7 series FPGA and a dual-core ARM Cortex-A9 processor. An FPGA program was developed for this task with the ability to monitor the data through WIFI on the ground station in addition to storing the data on a USB device.

To test the system, different GNSS outage scenarios were conducted ranging from 60 to 300 seconds. These were executed to evaluate the ability of the integration between OdoFin/INS/Mag systems to act as a replacement for GNSS during the outage.

In one test, simulating a 60 second GNSS outage, an INS solution was used as a dead-reckoning system. In another test, the present invention was used as an aiding sensor when the same 60 second GNSS outage was simulated. The results showed a 2D RMSE (root mean square error) of 144 m for the INS dead-reckoning and a 2D RMSE of 0.91 m for the system incorporating the present invention.

In another series of test flights, the present invention was integrated with INS and a magnetometer and differing periods of GNSS outages were simulated. As can be seen from Table I below, the RMSE for these various periods of time when GNSS was unavailable can be quite small.

TABLE 1

RMSE for integrated invention/INS/magnetometer as a replacement for different GNSS outage periods

|  | 60 seconds | 120 seconds | 180 seconds | 300 seconds |
| --- | --- | --- | --- | --- |
| North - RMSE (m) | 0.55 | 2.73 | 3.41 | 8.65 |
| East - RMSE (m) | 0.73 | 2.60 | 3.28 | 3.54 |
| 2D RMSE (m) | 0.91 | 3.77 | 4.73 | 9.34 |

Figure 12:
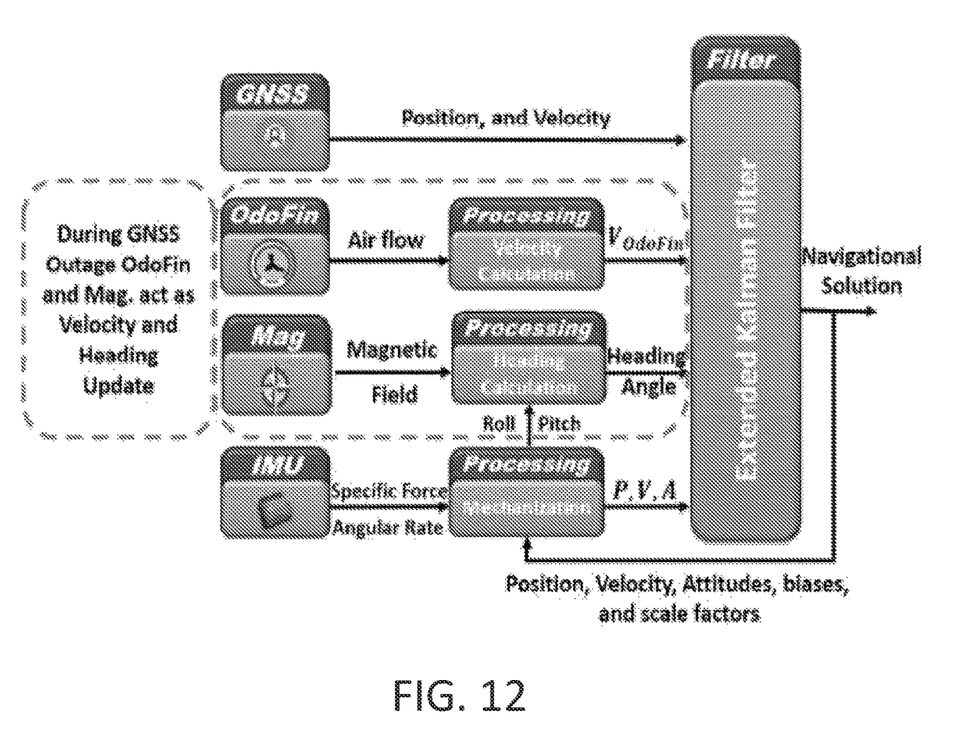
FIG. 12 is a block diagram illustrating the role of the present invention in a navigation system if there is a GNSS system outage.

Referring to FIG. 12, a schematic diagram is presented where the role of the present invention when there is a GNSS outage is illustrated. As can be seen, when GNSS is available, position and velocity parameters from GNSS is sent to an extended Kalman filter (EKF). Similarly, an IMU sends specific force and angular rate data to a processing block that also receives the position, velocity, attitude, and biases as feedback from the output of the EKF. The results are the position, velocity, and attitude that are fed back to the EKF. If the GNSS is unavailable, the system of the present invention is used in conjunction with a magnetometer to provide a velocity reading and a heading angle reading to the EKF. These readings are in place of the position and velocity that the GNSS would normally provide to the EKF.

It should be clear that, although the embodiments explained above use the system of the present invention to determine the speed of an airborne device, the present invention may be used on any moving vehicle and/or device. Surface vehicles and surface moving devices may also use the present invention to determine their speed in much the same manner as explained above.

A person understanding this invention may now conceive of alternative structures and embodiments or variations of the above all of which are intended to fall within the scope of the invention as defined in the claims that follow.

We claim:

1. A system for use in determining a speed of a moving device, the system comprising:
    a rigid plate having a front side exposed to an airflow outside of said device as said device is moving, said airflow causing said rigid plate to deflect from a predefined resting position;
    a subsystem for measuring an amount of deflection of said rigid plate as said rigid plate deflects due to said airflow as said device is in motion;
    wherein said amount of deflection of said plate from said resting position is proportional to a speed of said airflow, said speed of said airflow being related to said speed of said moving device,
    and wherein said subsystem comprises a rotary encoder sensor coupled to said rigid plate, wherein said rotary encoder sensor detects a rotation angle of said rigid plate, said rotation angle being proportional to an amount of said deflection of said plate.

2. The system according to claim 1, wherein said subsystem further comprises:
    a magnet coupled to said rigid plate such that said deflection of said rigid plate causes said magnet to rotate about an axis; and
    a Hall effect sensor for detecting changes in peaks in a magnetic field due to said magnet, changes in said peaks of said magnetic field being proportional to said amount of deflection of said rigid plate.

3. The system according to claim 1, wherein, when said rigid plate is at said resting position, said front side is perpendicular to a direction of travel of said device.

4. The system according to claim 1, wherein said speed of said device as determined by said system is used to determine a position of said device.

5. The system according to claim 1, wherein said speed of said device is used as a navigational aid for said device when GNSS signals are unavailable to said device.

6. The system according to claim 1, wherein said speed of said device as determined by said system is used in conjunction with a magnetometer to provide a velocity reading for said device.

7. The system according to claim 1, wherein said speed of said device as determined by said system is used to determine a velocity of said device.

8. The system according to claim 7, wherein said velocity of said device is used to determine a position of said device when GNSS signal are unavailable to said device.

9. A speed determination system, the system comprising:
    a deflection-based subsystem mounted on a moving device exposed to an airflow, said deflection-based subsystem comprising a rigid component, wherein a deflection of said rigid component due to an exposure to said airflow is related to a speed of said moving device; and
    a deflection measurement subsystem for determining said deflection of said deflection-based subsystem;
    wherein
    said deflection is measured from a predefined resting position of said rigid component; and
    said deflection measurement subsystem comprises a rotary encoder sensor coupled to said rigid plate, wherein said rotary encoder sensor detects a rotation angle of said rigid component, said rotation angle being proportional to an amount of said deflection of said rigid component.

10. The system according to claim 9, wherein said deflection-based subsystem comprises a rigid plate having a front side exposed to said airflow outside of said moving device, said airflow causing said rigid plate to deflect from said predefined resting position.

11. The system according to claim 9, wherein a mass of said rigid component is adjustable.

12. The system according to claim 9, wherein said system is used to determine a position of a moving device.

13. The system according to claim 9, wherein said deflection measurement subsystem further comprises:
   a magnet coupled to said rigid component such that said deflection of said component causes said magnet to rotate about an axis; and
   a Hall effect sensor for detecting changes in peaks in a magnetic field due to said magnet, changes in said peaks of said magnetic field being proportional to said amount of deflection of said rigid component.

14. The system according to claim 13, wherein said component comprises a rigid plate having a front side exposed to said airflow outside of said moving device, said airflow causing said rigid plate to deflect from said predefined resting position.

15. A method for determining a speed of a moving device using a speed determination system mounted on said device, the method comprising:
   a) providing a deflection-based subsystem on said speed determination system, said deflection-based subsystem comprising a rigid component exposed to an airflow;
   b) determining an amount of a deflection of said rigid component, said deflection of said rigid component being caused by said airflow, said amount of deflection being measured relative to a predefined resting position;
   c) using a data processing device, calculating said speed based on said amount of deflection;

wherein
   said airflow is outside of said device as said device is moving; and
   a deflection of said rigid component is related to a speed of said moving device; and
   said deflection measurement subsystem comprises a rotary encoder sensor coupled to said rigid component, wherein said rotary encoder sensor detects a rotation angle of said rigid component, said rotation angle being proportional to an amount of said deflection of said rigid component.

16. The method according to claim 15, wherein said amount of deflection is measured as a rotation angle.

17. The method according to claim 16, wherein step c) is accomplished by calculating said speed as $$v = Sqrt\left(\tan\left(\frac{OdoFin_{angle}}{Const}\right)\right)$$

wherein
   v is said speed;
   $OdoFin_{angle}$ is said rotation angle; and
   const is a constant.

18. The method according to claim 17, wherein said constant is calculated using $$const = \frac{\rho A C_D}{2\ mg}$$

wherein
   $\rho$ is an air density;
   g is a gravity constant;
   m is a mass of said rigid component;
   A is an area of said rigid component exposed to said airflow; and
   ss$C_D$ is a lifting coefficient.

* * * * *